United States Patent
Malloy et al.

(10) Patent No.: US 8,505,339 B2
(45) Date of Patent: Aug. 13, 2013

(54) KNIT SLEEVE WITH KNIT BARRIER EXTENSION HAVING A BARRIER THEREIN AND METHOD OF CONSTRUCTION

(75) Inventors: Cassie Malloy, Bluebell, PA (US); Zhong Haui Zhang, Pottstown, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 84 days.

(21) Appl. No.: 13/249,667

(22) Filed: Sep. 30, 2011

(65) Prior Publication Data
US 2012/0082807 A1  Apr. 5, 2012

Related U.S. Application Data

(60) Provisional application No. 61/388,343, filed on Sep. 30, 2010.

(51) Int. Cl.
*D04B 1/22* (2006.01)
(52) U.S. Cl.
USPC ............................................... 66/170; 66/202
(58) Field of Classification Search
USPC ............... 66/178 R, 179, 180–186, 196, 170, 66/202
See application file for complete search history.

(56) References Cited

U.S. PATENT DOCUMENTS

| | | |
|---|---|---|
| 4,533,788 A | 8/1985 | Pokojny et al. |
| 5,405,312 A | 4/1995 | Jacobs |
| 5,538,045 A | 7/1996 | Piotrowski et al. |
| 5,617,900 A | 4/1997 | Weil |
| 5,843,542 A | 12/1998 | Brushafer et al. |
| 5,890,381 A * | 4/1999 | Leeke et al. ............... 66/170 |
| 5,992,185 A * | 11/1999 | Leeke et al. ............... 66/170 |
| 6,051,291 A | 4/2000 | Gladfelter et al. |
| 6,151,926 A * | 11/2000 | Leeke et al. ............... 66/170 |
| 6,340,510 B2 | 1/2002 | Hess et al. |
| 6,354,114 B1 * | 3/2002 | Sghiatti ..................... 66/178 R |
| 6,397,638 B1 * | 6/2002 | Roell .......................... 66/61 |
| 6,612,342 B2 | 9/2003 | Godel et al. |
| 6,887,543 B1 | 5/2005 | Louart et al. |
| 6,953,061 B2 | 10/2005 | Della Putta et al. |
| 6,978,643 B2 | 12/2005 | Akers et al. |
| 7,395,680 B2 * | 7/2008 | Baer et al. ................. 66/170 |
| 7,469,563 B2 * | 12/2008 | Wahlgren et al. .......... 66/169 R |
| 7,595,451 B2 | 9/2009 | Kircanski et al. |
| 7,647,946 B2 * | 1/2010 | Mirmand et al. ........... 138/110 |
| 7,757,517 B2 * | 7/2010 | Malloy ....................... 66/170 |
| 7,823,420 B2 * | 11/2010 | Andrieu et al. ............ 66/170 |
| 7,874,184 B2 * | 1/2011 | Malloy et al. .............. 66/170 |

(Continued)

FOREIGN PATENT DOCUMENTS
WO  2004001780  12/2003

OTHER PUBLICATIONS

US 7,874,187, 1/2011, Malloy et al. (withdrawn).

*Primary Examiner* — Danny Worrell
(74) *Attorney, Agent, or Firm* — Robert L. Stearns; Dickinson Wright, PLLC

(57) ABSTRACT

A knit sleeve and method of construction thereof is provided. The knit sleeve is constructed including a knit tubular wall and at least one knit tubular extension attached to the wall. Further, a barrier member is disposed in the at least one knit tubular extension. The at least one knit tubular extension and the barrier member are foldable at least partially about the knit tubular wall.

28 Claims, 7 Drawing Sheets

(56) References Cited

U.S. PATENT DOCUMENTS

2004/0140010 A1 7/2004 Hasslberger et al.
2007/0240896 A1 10/2007 Ott
2007/0251595 A1 11/2007 Chen
2009/0049868 A1 2/2009 Malloy
2010/0316822 A1 12/2010 Malloy

* cited by examiner

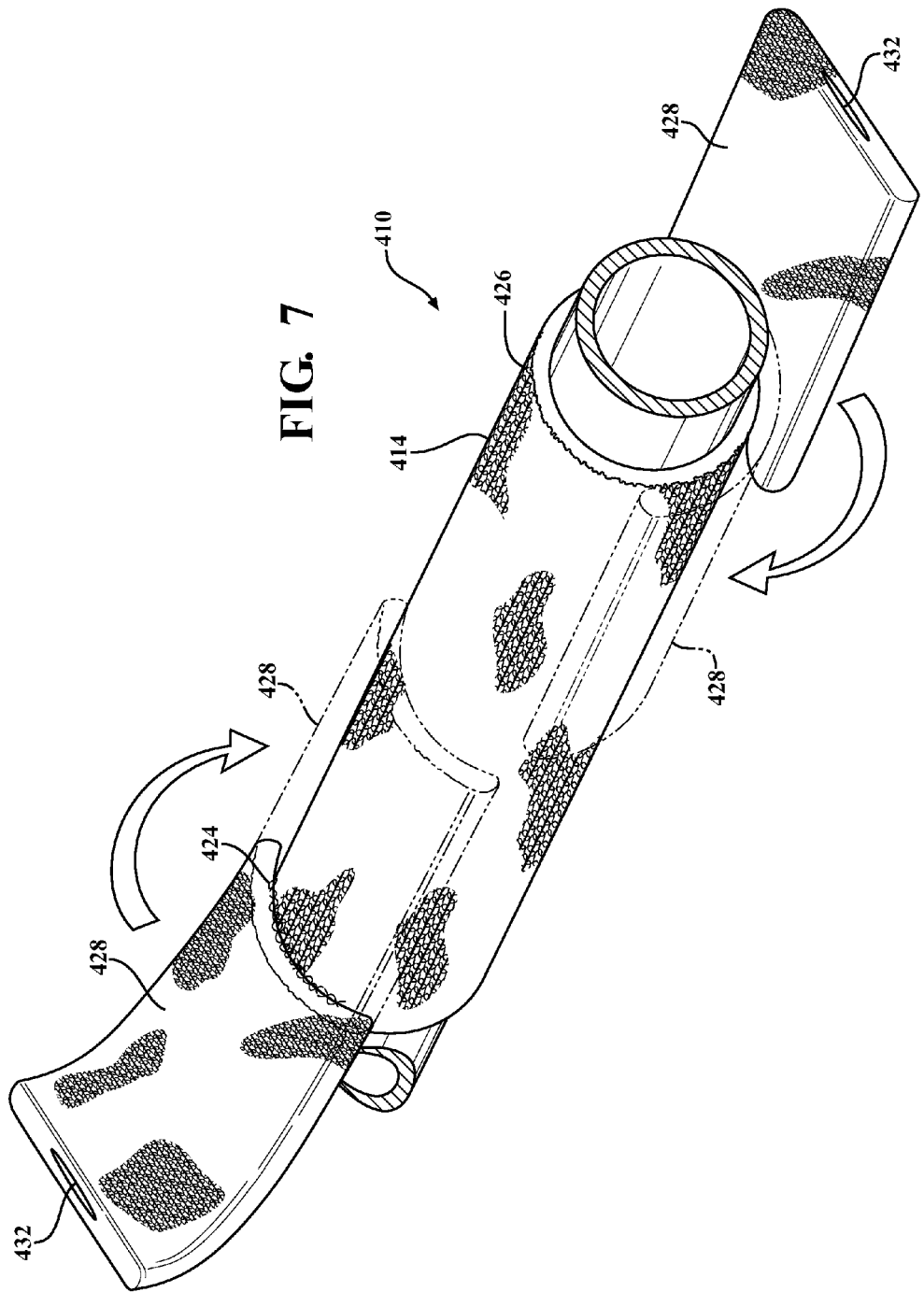

KNIT SLEEVE WITH KNIT BARRIER EXTENSION HAVING A BARRIER THEREIN AND METHOD OF CONSTRUCTION

CROSS-REFERENCE TO RELATED APPLICATIONS

This application claims the benefit of U.S. Provisional Application Ser. No. 61/388,343, filed Sep. 30, 2010, which is incorporated herein by reference in its entirety.

BACKGROUND OF THE INVENTION

1. Technical Field

This invention relates generally to textile sleeves for protecting elongate members, and more particularly to high temperature resistant knit sleeves.

2. Related Art

Tubular sleeves are known for use to protect and provide a barrier to heat radiation from elongate members, such as an exhaust pipe, for example. By blocking the heat from radiating outwardly from the heat source, nearby components, e.g. wire harnesses, are protected against damage from the radiant heat, and further, the retained heat can be utilized to minimize the emission of fuel vapor to the atmosphere. The sleeves are commonly constructed from heat resistant and/or fire retardant yarns to withstand relatively high temperatures. Sometimes the sleeves are constructed having multiple separate layers to facilitate block the heat from radiating outwardly. Although these sleeve are generally effective during initial use, they are commonly time consuming and cumbersome to install, while also being prone to damage during use from external environmental elements, e.g. stones, fluid contaminants, and debris from the road/terrain surface, thereby reducing their useful life.

A sleeve manufactured in accordance with the invention overcomes or greatly minimizes the tendency of a textile sleeve from becoming damaged, such as from abrasive elements and/or fluid contaminants.

SUMMARY OF THE INVENTION

A knit sleeve constructed in accordance with one aspect of the invention includes a knit tubular wall and at least one knit tubular extension attached to the wall. Further, a barrier member is disposed in the at least one knit tubular extension. The at least one knit tubular extension and the barrier member are foldable at least partially about the knit tubular wall.

In accordance with another aspect of the invention, the barrier member is an impervious sheet that prevents liquid from passing through the knit tubular extension and reaching an underlying outer surface of the knit tubular wall.

In accordance with another aspect of the invention, the knit tubular extension is knit at least in part from some of the same yarn used to knit the tubular wall.

In accordance with another aspect of the invention, the knit tubular extension is knit integrally with the tubular wall and at least in part with different yarn than used to knit the tubular wall.

In accordance with another aspect of the invention, the barrier member extends less than completely about the circumference of the tubular wall to avoid restricting expansion of the tubular wall.

In accordance with another aspect of the invention, the sleeve has a plurality of the knit tubular extensions.

In accordance with another aspect of the invention, the knit tubular extensions are configured to overlap different portions of the tubular wall outer surface.

In accordance with another aspect of the invention, a method of constructing a textile sleeve assembly is provided. The method includes knitting a tubular wall and knitting at least one tubular extension extending from the tubular wall while knitting the tubular wall. Further, disposing a barrier member in the at least one tubular extension.

In accordance with another aspect of the invention, the method includes providing the barrier member as an impervious sheet that prevents liquid from passing through the tubular extension and reaching an underlying outer surface of the tubular wall.

In accordance with another aspect of the invention, the method includes knitting the tubular extension at least in part from some of the same yarn used to knit the tubular wall.

In accordance with another aspect of the invention, the method includes knitting the tubular extension at least in part with different yarn than used to knit the tubular wall.

In accordance with another aspect of the invention, the method includes extending the barrier member less than completely about the circumference of the tubular wall to avoid restricting expansion of the tubular wall.

In accordance with another aspect of the invention, the method includes knitting a plurality of the tubular extensions extending from the tubular wall.

In accordance with another aspect of the invention, the method includes configuring a plurality of tubular extensions to overlap different portions of the sleeve outer surface.

In accordance with another aspect of the invention, the method includes forming the at least one tubular extension having a width sufficient to extend completely about the tubular wall.

In accordance with another aspect of the invention, the method includes providing at least one fastener adjacent at least one side of the at least one tubular extension with the fastener being configured to fix the at least one tubular extension completely about the tubular wall.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

FIG. 7 is a perspective view of a sleeve constructed in accordance with another aspect of the invention;

DETAILED DESCRIPTION OF PREFERRED EMBODIMENTS

Figure 1:
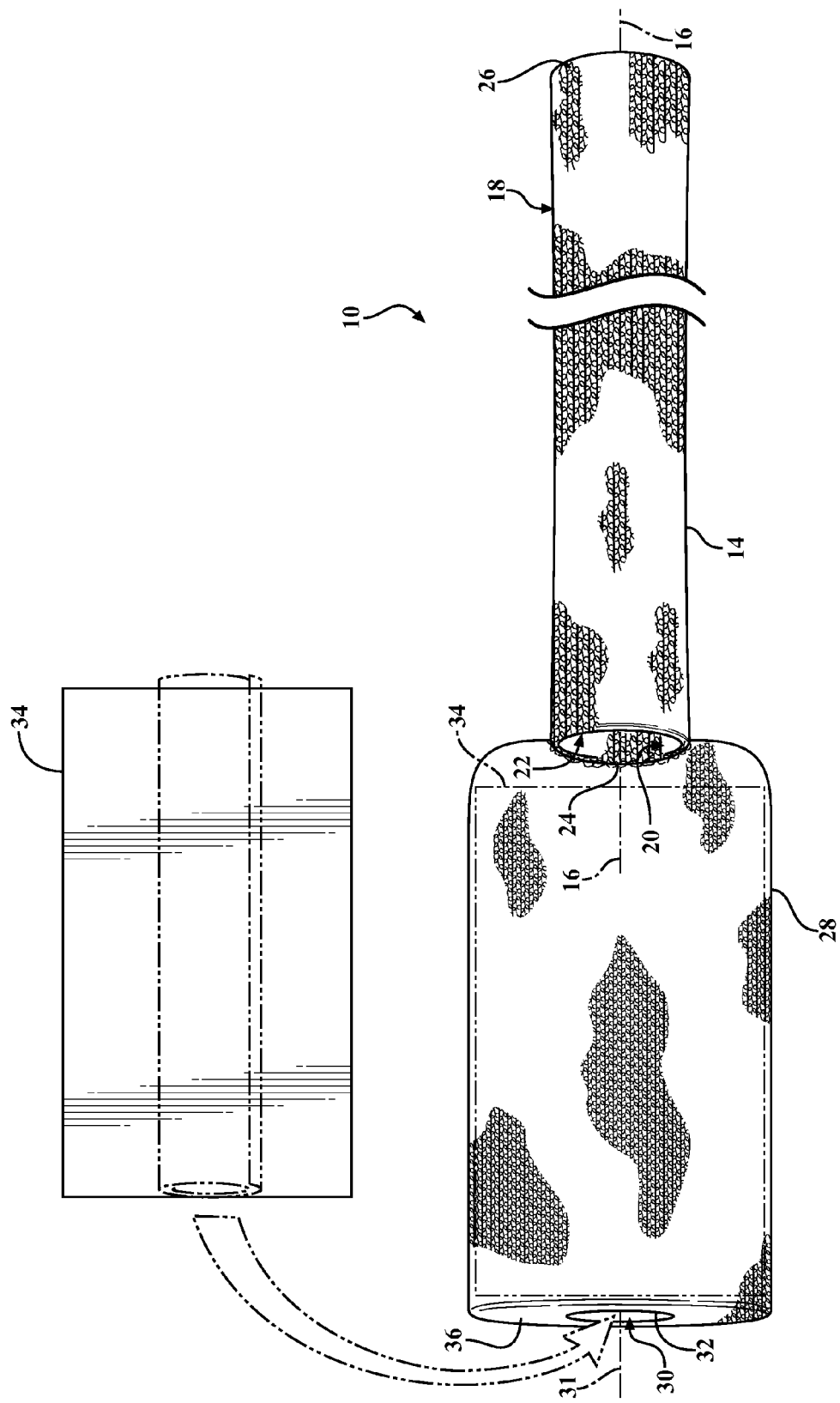
FIG. 1 is a plan view of a textile sleeve and barrier constructed in accordance with one presently preferred embodiment of the invention with a tubular extension of the sleeve shown in an unfolded position and the bather removed from a receptacle of the tubular extension.
Figure 2:
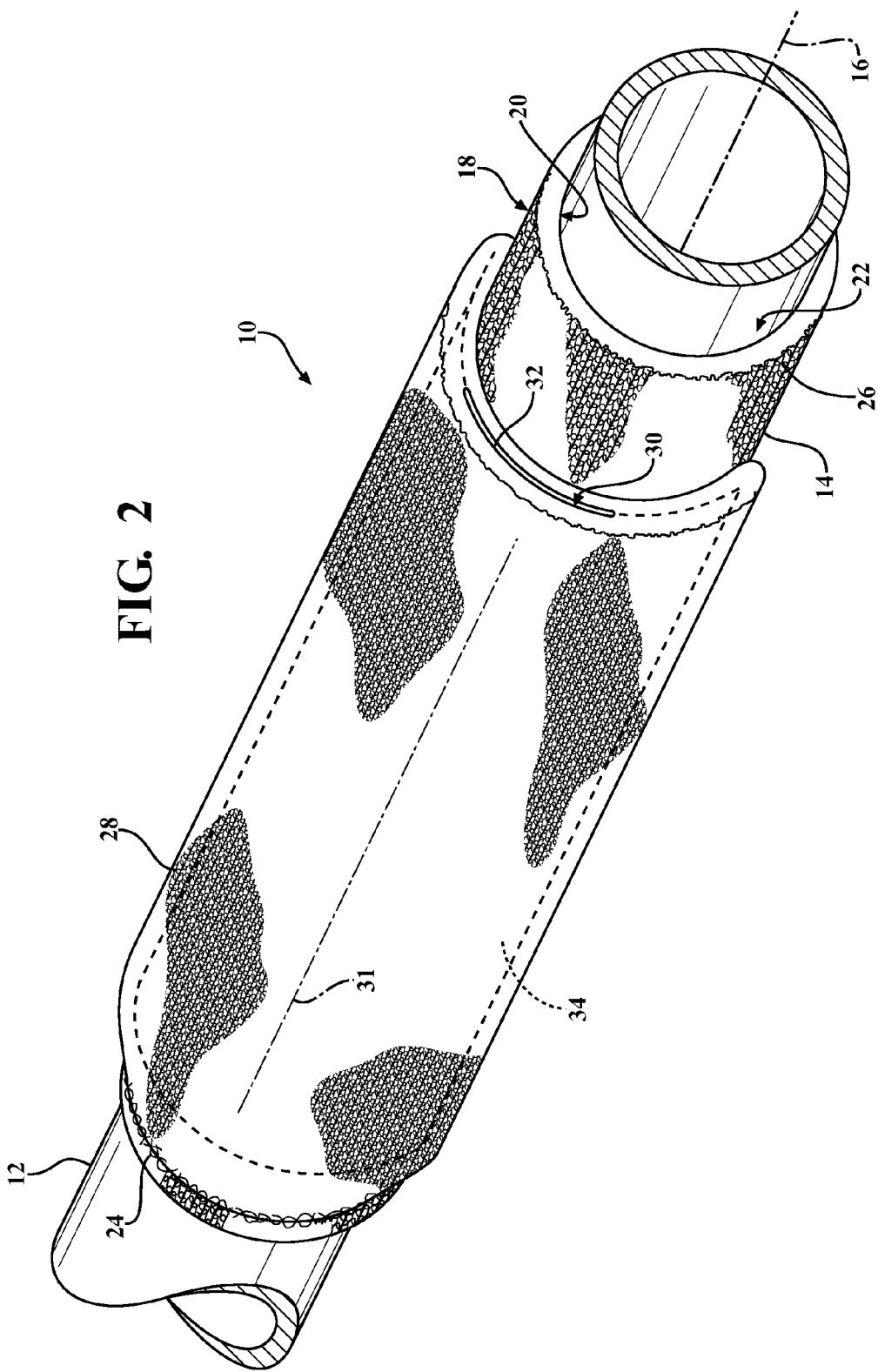
FIG. 2 is a perspective view of the sleeve disposed about an elongate member to be shielded with the tubular extension shown folded overlying a portion of an outer surface of the sleeve and with the barrier received in the receptacle of the tubular extension.
Figure 3:
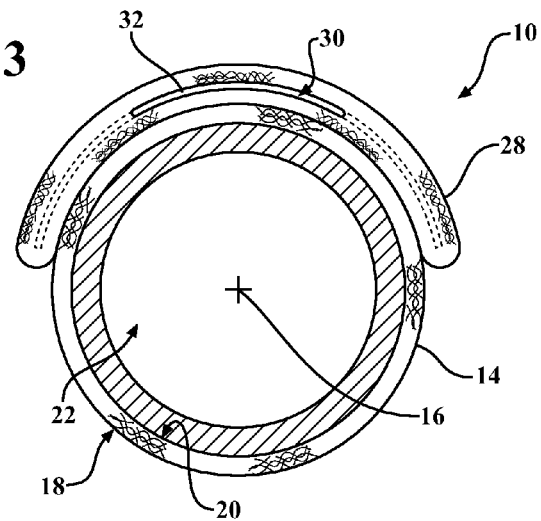
FIG. 3 is an end view of the sleeve of the FIG. 1.

Referring in more detail to the drawings, FIGS. 1-3 show a tubular textile sleeve 10 constructed according to one presently preferred embodiment of the invention. The sleeve 10 protects and provides a barrier to heat radiation from hot elongate members, such as hot pipes within an engine compartment or an exhaust pipe 12, for example, and also a barrier to environmental contaminants from damaging the sleeve 10, such as hard debris and liquid contaminants, e.g. fuel, oil, water. By blocking the heat from radiating outwardly from the exhaust pipe 12, nearby components, e.g. wire harnesses, sensors, and other heat sensitive components (not shown), are protected against damage from radiant heat. In addition, by retaining the heat within the sleeve 10, the emissions flowing through the exhaust pipe 12 are heated sufficiently to facilitate preventing their being expelled to the environment. Further yet, by providing a bather to fuel, oil and other combustible liquids, from reaching the exhaust pipe 12, a thermal condition, e.g. flame, is prevented and the insulating properties of the sleeve 12 are maintained.

The textile sleeve 10 has one or more yarns interlaced via a knitting process with one another to form a closed, circumferentially continuous wall 14 extending along a first longitudinal axis 16 of the sleeve 10. The wall 14 has an outer surface 18 and an inner surface 20 bounding a cavity 22 extending axially along the longitudinal axis 16 between opposite ends 24, 26 of the sleeve 10. The sleeve 10 further includes at least one knit tubular extension 28 extending as an integrally knit member from the tubular wall 14 of the sleeve 12 such that the extension 28 and the wall 14 are knit together in a continuous knitting process. The extension 28 provides an enclosed or substantially enclosed receptacle 30 separate from the cavity 22 of the sleeve such that the receptacle extends along a second longitudinal axis 31 separate from and spaced from the first longitudinal axis 16, wherein the axis 31 extends generally parallel to the axis 16, however, the axis 31 is spaced radially outwardly from the outer surface 18 of the wall 14. Accordingly, the receptacle 30 does not extend along or share the axis 16 of the cavity 22. The extension 28 has an opening 32 sufficiently sized for receipt of a barrier member, referred to hereafter a barrier and identified generally by reference numeral 34 and offset references numerals thereof, wherein the barrier 34 could be required to be folded for disposal through the opening 32 into the receptacle 30 and thereafter expanded within the receptacle 30, depending on the size of the opening 32 integrally knit in the extension 28. It should be recognized that the opening 32 can be knit having the desired size, and thus, the opening 32 can extend less than completely across the extension 28 or completely across the extension 28, as desired.

During construction of the sleeve 10, the barrier 34 is disposed in the receptacle 30 through the opening 32. Then, during assembly of the sleeve 10 on the elongate member 12 to be protected and insulated, the sleeve wall 14 is readily stretched and disposed over the elongate member 12 and then the tubular extension 28 of the sleeve is folded or wrapped against the outer surface 18 of the wall 14 and fixed in place. The tubular extension 28 can be fixed in place about the wall 14 via hose clamps, tie wraps, or any other suitable fastening mechanism (not shown).

The sleeve wall 14 is constructed using a knitting process, such as on a computerized flat bed knitting machine, by way of example and without limitation, wherein the type of knit stitches can be varied, as desired, for the intended application. Accordingly, the wall 14 can be knit using any type or combination of knit stitches, e.g. jersey, interlock, rib forming stitches, or otherwise, such that the wall 14 may be knit using a single or multiple knit stitch types. Further, the wall 14 can be constructed of any suitable length and diameter. Accordingly, the wall 14 can be constructed having various configurations. For example, although the wall 14 is represented as single wall, it could be constructed having a reversed folded configuration, such that it could provide a dual wall layer in use, if desired. Further yet, the wall 14 can be constructed from varying types of yarn, such as in one presently preferred construction, by way of example, from a heat resistant yarn (multifilament and/or monofilament) suitable for withstanding extreme temperature environments ranging from between about −60 to 1400 degrees centigrade. Some of the selected multifilament yarns can be formed with mineral fiber materials, such as silica, fiberglass, ceramic, basalt, aramid or carbon, by way of example and without limitation. The mineral fibers can be provided having a continuous or chopped fiber structure. In some applications of extreme heat, it may be desirable to heat treat the sleeve material to remove organic content therefrom, thereby increasing the heat resistance capacity of the sleeve 10.

The extension 28 is knit as an integral extension from the wall 14, as shown in FIG. 1, by way of example and without limitation, as extending from the end 24 of the wall 14. Then in use, the extension 28 is subsequently folded back over the outer surface 18 of the wall 14 and fixed in place. The extension 28 can be knit, in part or wholly, using same ends of yarn or yarns as the wall 14, thereby providing a seamless transition from the wall 14 to the extension 28. Otherwise, the extension 28 can be knit, in part or wholly, from different ends of yarn or yarns that are knit stitched with the yarn or yarns of the wall 14 in a continuous, uninterrupted knitting operation used to construct the sleeve wall 14. For example, the extension 28, in order to provide optimal protection against abrasion and damage from debris, can be knit from durable yarn, such as wire, e.g. stainless steel wire, for example. Further, to provide additional protection against fluid degradation of the yarn, hydrophobic and/or oleophobic yarns (such as fluorobased coated yarns, e.g. PTFE) can be used. Further, the type of knit stitches use to construct the extension can be varied, as desired, and thus, can be the same or different from the type of knit stitches used to construct the wall 14. Accordingly, the extension 28 can be constructed having the desired type of knit stitch and type of yarn best suited for the intended application.

The opening 32 is shown in FIGS. 1 and 2, for example, as being formed at a free or terminal end 36 of the extension 32. The opening 32 is shown formed having a width extending less than completely across the full width of the extension 32 to facilitate maintaining the barrier 34 in the receptacle 30, though the opening 32 could extend across the full width of the extension 28, if desired. The opening 32 is preferably formed integrally in the knitting process, and thus, has knit, uncut edges.

The barrier 34 is disposed through the opening 32 and into the receptacle 30 of the extension 28. If needing to be folded to fit through the opening 32, the bather is unfolded to retain its expanded shape within the receptacle 30. Then, with the barrier 34 captured in the receptacle 30, the extension 28 is folded over against the outer surface 18 of the wall 14 to protect the wall 14, thereby protecting the wall 14 against exposure to external debris and fluid contamination. Thus, the wall 14 is free from potential damage from such debris and fluid. Thus, if the elongate member 12 reaches high temperatures, any combustible fluids are kept from reaching the elongate member 12, and thus, the risk of flame or burning is substantially eliminated. In addition, the insulating properties of the wall 14 are maintained, thereby allowing the contents flowing through the elongate member 12 to be maintained at a controlled temperature.

The barrier 34 can be provided in a wide variety of materials, including, by way of example and without limitation, foils (aluminum, steel, stainless steel, or the like), films (PEEK, thermoplastics), coated fabrics (elastomer coatings, or the like applied to textile fabrics), and layers or laminations thereof, or otherwise, as desired. Further, the barrier 34 can be provided having any desired stiffness, flexibility and/or shape (corrugated to facilitate expanding around corners, die cut having cut out or slit regions to facilitate forming around bends). To provide maximum protection against the passage of fluid through the barrier 34, the barrier 34 is preferably provided as a solid, fluid impervious sheet material of one or more of the aforementioned materials or having a layer of a solid, fluid impervious sheet material of one or more of the aforementioned materials.

Figure 4:
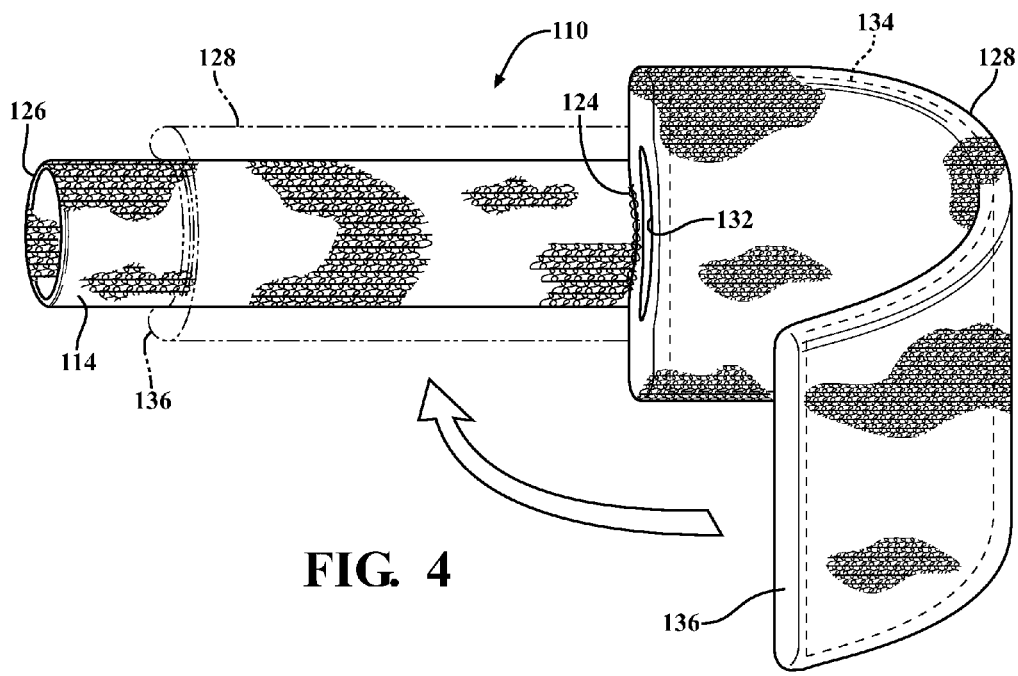
FIG. 4 is a perspective view of a sleeve constructed in accordance with another aspect of the invention.

In FIG. 4, a sleeve 110 constructed in accordance with another aspect of the invention is shown, wherein the same reference numerals are used as above, offset by a factor of 100, to identify like features. The sleeve 110 has a wall 114 extending between opposite ends 124, 126 with a tubular extension 128 extending from one of the ends 124, 126, shown here as the end 124. The extension 128 has an opening 132 sized for receipt of a barrier 134 (shown in phantom), however, rather than the opening being formed at a terminal end 136, the opening 132 is formed at or near the junction between the wall 114 and the extension 128 adjacent the end 124 of the wall 114. As with the sleeve 10, the extension 128 is folded over to bring the extension 128 and the barrier 134 therein into overlying relation with a desired portion of the wall 114, whereupon the extension 128 is fixed in place. Otherwise, the sleeve 110 is the same as the sleeve 10, and thus, no further discussion is necessary.

Figure 5:
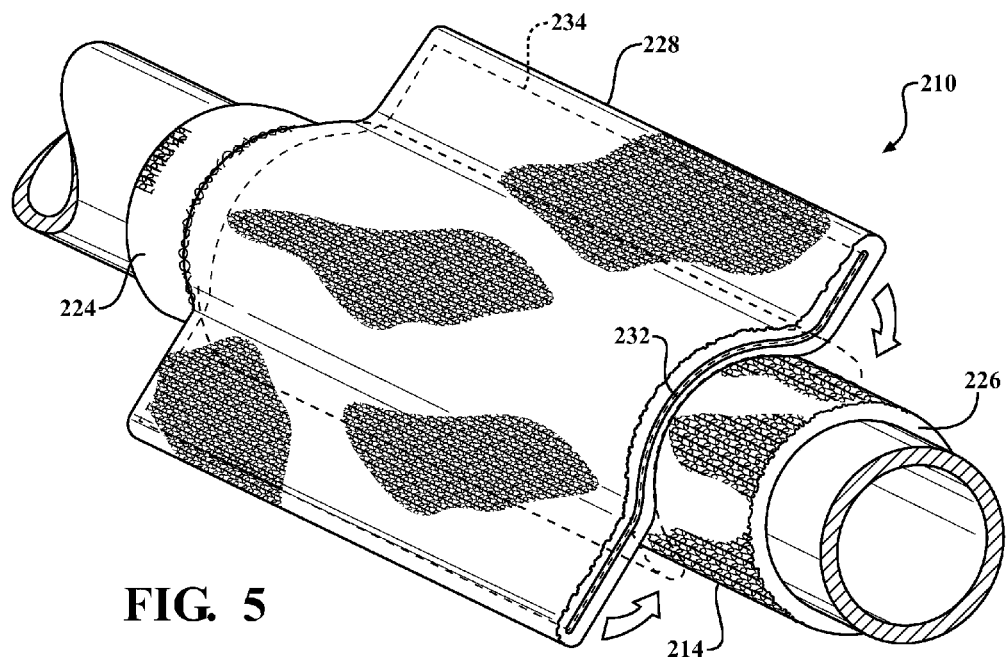
FIG. 5 is a perspective view of a sleeve constructed in accordance with another aspect of the invention.

In FIG. 5, a sleeve 210 constructed in accordance with another aspect of the invention is shown, wherein the same reference numerals are used as above, offset by a factor of 200, to identify like features. The sleeve 210 has a wall 214 extending between opposite ends 224, 226 with a tubular extension 228 extending from the wall 214. However, unlike the previous embodiments, the extension 228 does not extend directly from one of the ends 224, 226, but rather, the extension 228 is joined to a portion of the wall 214 located between the ends 224, 226. Thus, it should be recognized that an extension, as described herein and illustrated, can extend from virtually any location along the wall of the sleeve. As with the previous embodiments, the extension 228 has an opening 232, shown as extending completely across the width of the extension 228, by way of example, wherein the opening 232 is sized for receipt of a barrier 234 (shown in phantom).

Figure 6:
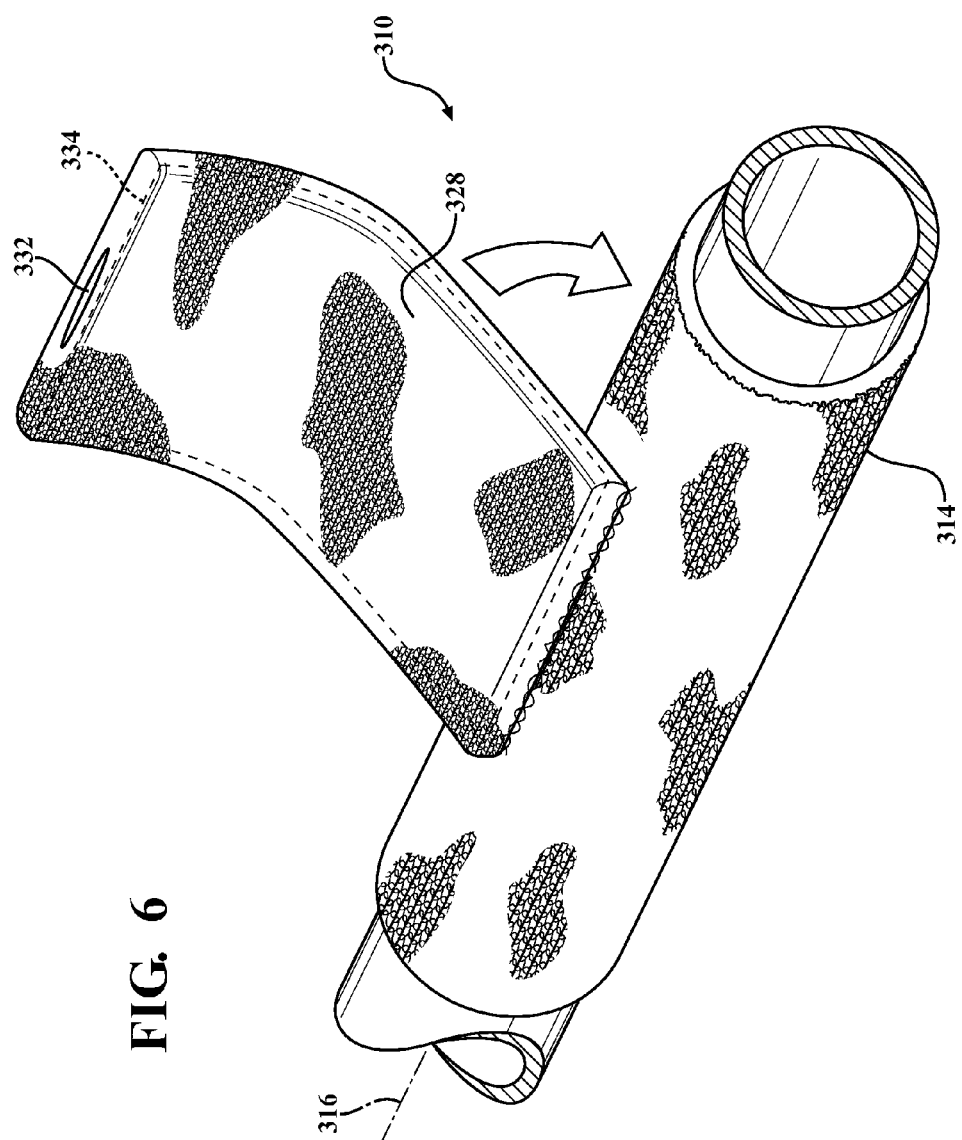
FIG. 6 is a perspective view of a sleeve constructed in accordance with another aspect of the invention.

In FIG. 6, a sleeve 310 constructed in accordance with another aspect of the invention is shown, wherein the same reference numerals are used as above, offset by a factor of 300, to identify like features. The sleeve 310 has a wall 314 extending between opposite ends 324, 326 with a tubular extension 328 extending from the wall 314. However, unlike the previous embodiments, the extension 328 does not extend parallel to or substantially parallel to a central longitudinal axis 316 of the sleeve 310. Rather, the extension 328 extends obliquely to the axis 316, shown as extending transversely or substantially transversely to the axis 316, by way of example and without limitation. The extension 328 has an opening 332 sized for receipt of a barrier 334 (shown in phantom). Upon disposing the barrier 334 in the tubular extension 328 and disposing the wall 314 of the sleeve 310 about the elongate member to be protected, the extension 328 and barrier 334 disposed therein can be wrapped circumferentially about the wall 314 and fixed about a portion (or full circumference) of the sleeve wall 314. Accordingly, protection to the sleeve wall 314 against debris and fluids can be provided about precise portions of the wall circumference or an entire circumference of the sleeve wall 314 as needed for the intended application. It should be recognized that the extension 328 can be as wide and as long as necessary to cover the desired portions of the sleeve wall 314. Further, it should be recognized that the extension 328 can be extended from any portion of the sleeve wall 314.

In FIG. 7, a sleeve 410 constructed in accordance with another aspect of the invention is shown, wherein the same reference numerals are used as above, offset by a factor of 400, to identify like features. The sleeve 410 has a wall 414 extending between opposite ends 424, 426 and is constructed similarly to that described above with regard to the sleeve 10, however, rather than having a single extension, the sleeve 410 has a pair of tubular extensions 428 extending from the wall 414. The extensions 428 are shown as extending from each of the opposite ends 424, 426. The extensions 428 have openings 432 sized for receipt of a barrier 434 (shown in phantom). Upon disposing the barriers 434 in the tubular extensions 428, the extensions 428 are folded over opposite sides of the sleeve wall 414 (shown in phantom). Accordingly, enhanced protection to the sleeve wall 414 against debris and fluids can be provided about precise portions of the circumference or an entire circumference of the sleeve wall, depending on the widths of the extensions 428. As with the previous embodiments, it should be recognized that the extensions 428 can be as wide and as long as necessary to cover the desired portions of the sleeve wall 414. Further, it should be recognized that additional extensions could be integrally knit on the wall 414 as desired to provide the protection needed for the intended application.

Figure 9:
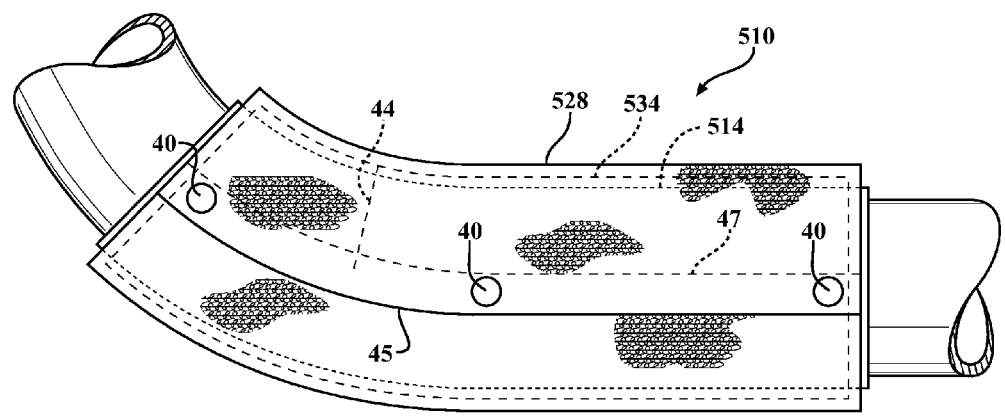
FIG. 9 is a perspective view of the sleeve of FIGS. 8A-8B shown assembled about an exhaust pipe.
Figure 8A:
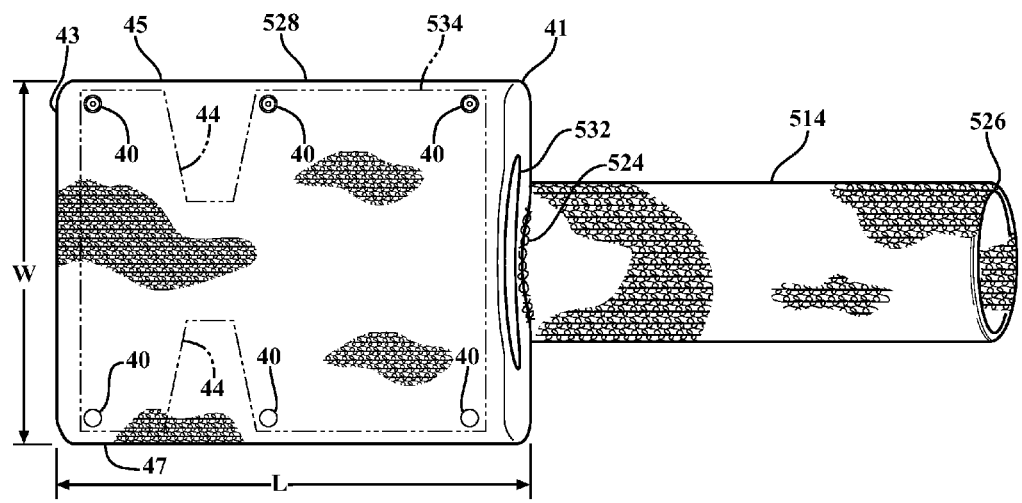
FIG. 8A is a top view of a sleeve constructed in accordance with another aspect of the invention.
Figure 8B:
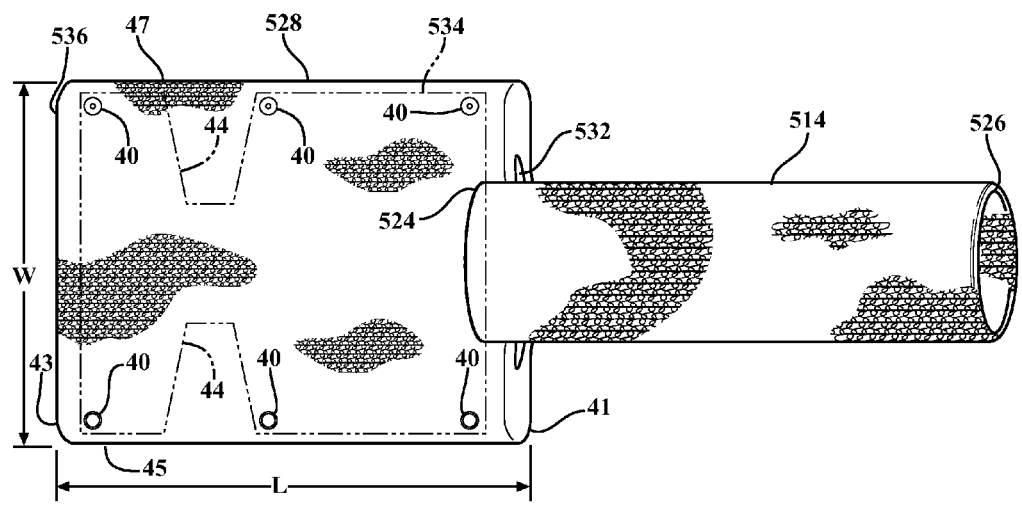
FIG. 8B is a bottom view of the sleeve of FIG. 8A.

In FIGS. 8A, 8B and 9, a sleeve 510 constructed in accordance with another aspect of the invention is shown, wherein the same reference numerals are used as above, offset by a factor of 500, to identify like features. As best shown in FIGS. 8A and 8B, the sleeve 510 has a wall 514 extending between opposite ends 524, 526 and is constructed similarly to that described above with regard to the sleeve 10. In addition, as with all the embodiments aforementioned, and similarly to the sleeves 10, 110 of FIGS. 1 and 4, the sleeve 510 has a tubular extension 528 extending from one of the ends 524, 526, shown here as the end 524. The extension 528 has an opening 532 sized for receipt of a bather 534 (shown in phantom). By way of example and without limitation, the opening 532 is shown as being formed at or near the junction between the wall 514 and the extension 528 adjacent the end 524 of the wall 514. However, it should be recognized that the opening 532 could be formed at an opposite end, as discussed above with regard to sleeve 10 of FIG. 1, or anywhere along the length of the extension 528, also discussed above. Upon disposing the barrier 534 in the tubular extension 528, the extension 528 is folded over to bring the extension 528 and the barrier 534 therein into overlying relation with the wall 514, whereupon the extension 528 is fixed in place.

As in the embodiments discussed above, the extension 528 extends along a length (L) between its opposite ends 41, 43 sufficient to cover the length of the wall 514 desired, including the full length of the wall 514, if desired. The extension 528 also extends along a width (W) between its opposite sides 45, 47 sufficient to be wrapped completely about the full circumference of the wall 514. As such, upon being folded over the wall 514 and fixed in place, the extension 528 completely encircles the wall 514. To provide maximum protection about the full circumference of the wall 514, the barrier 534 is provided having the same or substantially the same length (L) and width (W) as the extension 528, and thus, it too wraps completely about and encapsulates the full outer surface of the wall 514. To facilitate fixing the extension 528 and barrier 534 about the wall 514, the extension 528 is provided with at least one, and shown as a plurality of fasteners 40. The fasteners 40 are positioned for attachment to one another upon wrapping the extension 528 about the wall 514, and are shown as being fixed adjacent the opposite, lengthwise extending sides 45, 47. In addition to being fixed to the wall 514, the fasteners 40 can also be fixed to the barrier 534, such as by extending through the barrier 534. If extending through the barrier 534, the barrier 534 is first inserted into the tubular extension 528 and then the respective female and male components of the fasteners 40 are inserted through the wall 514 and the barrier 534 adjacent their respective length wise extending edges. As such, the barrier 534 is fixed inside the tubular extension 528 by the fasteners 40, and thus, the opening 532 can extend across the full width (W) of the extension 528 without concern of the bather 534 becoming inadvertently dislodged therefrom.

As shown in FIGS. 8A and 8B, the barrier 534 can be die-cut to take on any desired configuration. In the embodiment shown, a pair of recessed slits or cutout regions 44 are formed to facilitate wrapping the sleeve 510 about the elongate member 512 being protected (FIG. 9). The cutout regions 44 allow the barrier 534 to be readily wrapped about a bend in the elongate member 512 without buckling or tearing, thereby providing an aesthetically pleasing and fully functional barrier.

As in the embodiments discussed above, the wall 514 can be knit from any type or combination of knit stitches, e.g. jersey, interlock, rib forming stitches, or otherwise, and further, from any suitable yarn, such as yarn capable of withstanding extreme temperatures, e.g. mineral fiber materials, such as silica, fiberglass, ceramic, basalt, aramid or carbon, by way of example and without limitation. The extension 528 can be knit, at least in part or entirely from different ends of yarn or yarns that are knit stitched with the yarn or yarns of the wall 514, as discussed above. Otherwise, the extension 528 can be knit from different types of yarn from that of the wall 514. For example, the wall 514 can be knit from one or more of the aforementioned extreme temperature yarns, while the extension 528, in order to provide optimal protection against abrasion and damage from debris, can be knit from a highly durable yarn, such as wire, e.g. stainless steel wire, for example. Further, barrier 534 can be provided in a wide variety of materials or laminations thereof, including, by way of example and without limitation, foils (aluminum, steel, stainless steel, or the like), films (PEEK, thermoplastics, or the like), coated fabrics (elastomer coatings, or the like applied to textile fabrics), or otherwise, as desired.

It should be recognized that sleeves constructed in accordance with the invention are suitable for use in a variety of applications, regardless of the sizes and lengths required. For example, they could be used in automotive, marine, industrial, aeronautical or aerospace applications, or any other application wherein protective sleeves are desired to protect nearby components against heat radiation and to protect the sleeves and hot members contained therein from exposure to volatile fluid and thermal conditions.

It is to be understood that the above detailed description is with regard to some presently preferred embodiments, and that other embodiments which accomplish the same function are incorporated herein within the scope of any ultimately allowed claims.

What is claimed is:

1. A knit sleeve, comprising:
   a knit tubular wall;
   at least one knit tubular extension attached to said wall; and
   a barrier member disposed in said at least one tubular extension, said at least one knit tubular extension and said barrier member being foldable at least partially about said knit tubular wall, said barrier member includes an impervious, solid sheet of material.

2. The knit sleeve of claim 1 wherein said knit tubular wall is knit at least in part from a first yarn type and said at least one knit tubular extension is knit at least in part from a second yarn type different from said first yarn type.

3. The knit sleeve of claim 2 wherein said first yarn type is a high temperature resistant yarn and said second yarn type is wire.

4. The knit sleeve of claim 3 wherein said first yarn type is a multifilament.

5. The knit sleeve of claim 1 wherein said barrier member is impervious to fluid.

6. A knit sleeve, comprising:
   a knit tubular wall;
   at least one knit tubular extension attached to said wall; and
   a barrier member disposed in said at least one tubular extension, said at least one knit tubular extension and said barrier member being foldable at least partially about said knit tubular wall; and
   wherein said knit tubular wall extends along a first longitudinal axis and said at least one knit tubular extension extends along a second longitudinal axis spaced from said first longitudinal axis.

7. The knit sleeve of claim 6 wherein said first longitudinal axis and said second longitudinal axis are substantially parallel.

8. The knit sleeve of claim 6 wherein said first longitudinal axis and said second longitudinal axis are non-parallel.

9. The knit sleeve of claim 1 wherein said knit tubular wall has an inner surface bounding a cavity and an outer surface, said at least one knit tubular extension overlying said outer surface.

10. The knit sleeve of claim 1 wherein said at least one knit tubular extension includes a plurality of knit tubular extensions.

11. The knit sleeve of claim 10 wherein said knit tubular wall extends between opposite ends and said plurality of knit tubular extensions extend from said opposite ends.

12. The knit sleeve of claim 1 wherein said knit tubular wall extends between opposite ends and said at least one knit tubular extension extends from at least one of said opposite ends.

13. The knit sleeve of claim 12 wherein said at least one knit tubular extension has a knit opening adjacent said at least one of said opposite ends.

14. The knit sleeve of claim 12 wherein said at least one knit tubular extension has a width extending between opposite sides, said width being sufficient to extend completely about said knit tubular wall.

15. The knit sleeve of claim 14 further comprising at least one fastener adjacent at least one of said opposite sides, said fastener being configured to fix said at least one knit tubular extension completely about said knit tubular wall.

16. The knit sleeve of claim 1 wherein said at least one knit tubular extension wraps completely about said knit tubular wall.

17. The knit sleeve of claim 1 wherein said at least one knit tubular extension is integrally knit with said knit tubular wall.

18. The knit sleeve of claim 1 wherein said at least one knit tubular extension and said knit tubular wall are knit having at least one common yarn.

19. A method of constructing a knit sleeve, comprising:
knitting a tubular wall;
knitting at least one tubular extension extending from the tubular wall while knitting the tubular wall; and
disposing a barrier member including an impervious, solid sheet of material in the at least one tubular extension.

20. The method of claim 19 further including knitting the tubular wall at least in part from a first yarn type and knitting the at least one tubular extension at least in part from a second yarn type different from the first yarn type.

21. The method of claim 19 knitting the tubular wall extending along a first longitudinal axis and knitting the at least one tubular extension extending along a second longitudinal axis spaced from the first longitudinal axis.

22. The method of claim 19 further including knitting a plurality of tubular extensions extending from the tubular wall while knitting the tubular wall.

23. The method of claim 22 further including knitting the plurality of tubular extensions extending from opposite ends of the tubular wall.

24. The method of claim 19 further including knitting the at least one tubular extension extending from at least one end of the tubular wall.

25. The method of claim 24 knitting an opening in the at least one tubular extension adjacent the at least one end of the tubular wall.

26. The method of claim 19 further including knitting the at least one tubular extension having a width sufficient to extend completely about the tubular wall.

27. The method of claim 26 further including providing at least one fastener adjacent at least one side of the at least one tubular extension with the fastener being configured to fix the at least one tubular extension completely about the tubular wall.

28. The method of claim 19 further including knitting the at least one tubular extension and the knit tubular wall having at least one common yarn.

* * * * *